Jan. 24, 1956     H. E. TEMPLE     2,732,057
BAKERY CONVEYOR SYSTEM
Filed Dec. 5, 1951.     9 Sheets-Sheet 1
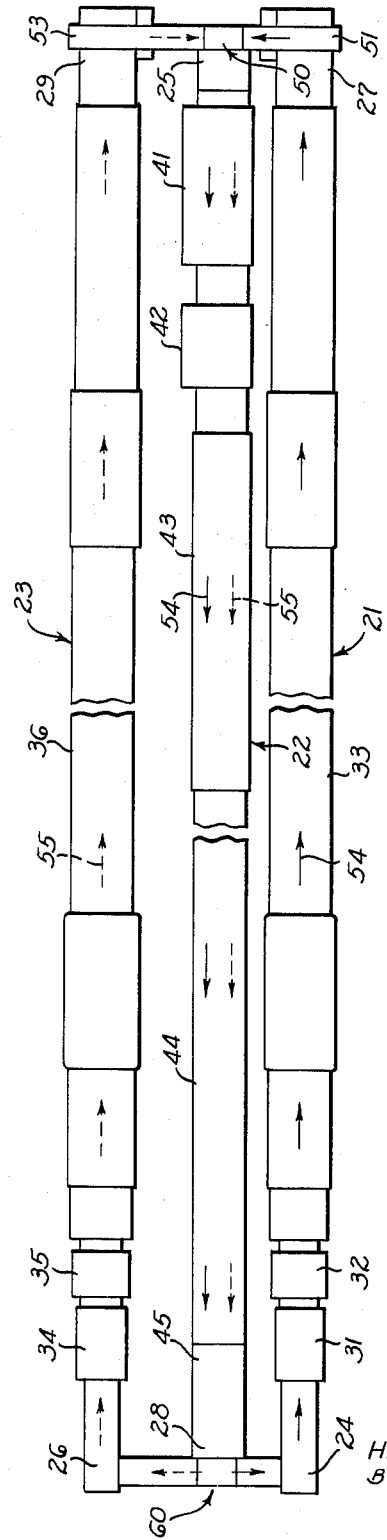
Fig. 1.
INVENTOR.
HIRAM E. TEMPLE
BY HIS ATTORNEYS.
HARRIS, KIECH, FOSTER & HARRIS
BY Jan. 24, 1956
H. E. TEMPLE
2,732,057
BAKERY CONVEYOR SYSTEM
Filed Dec. 5, 1951
9 Sheets-Sheet 2
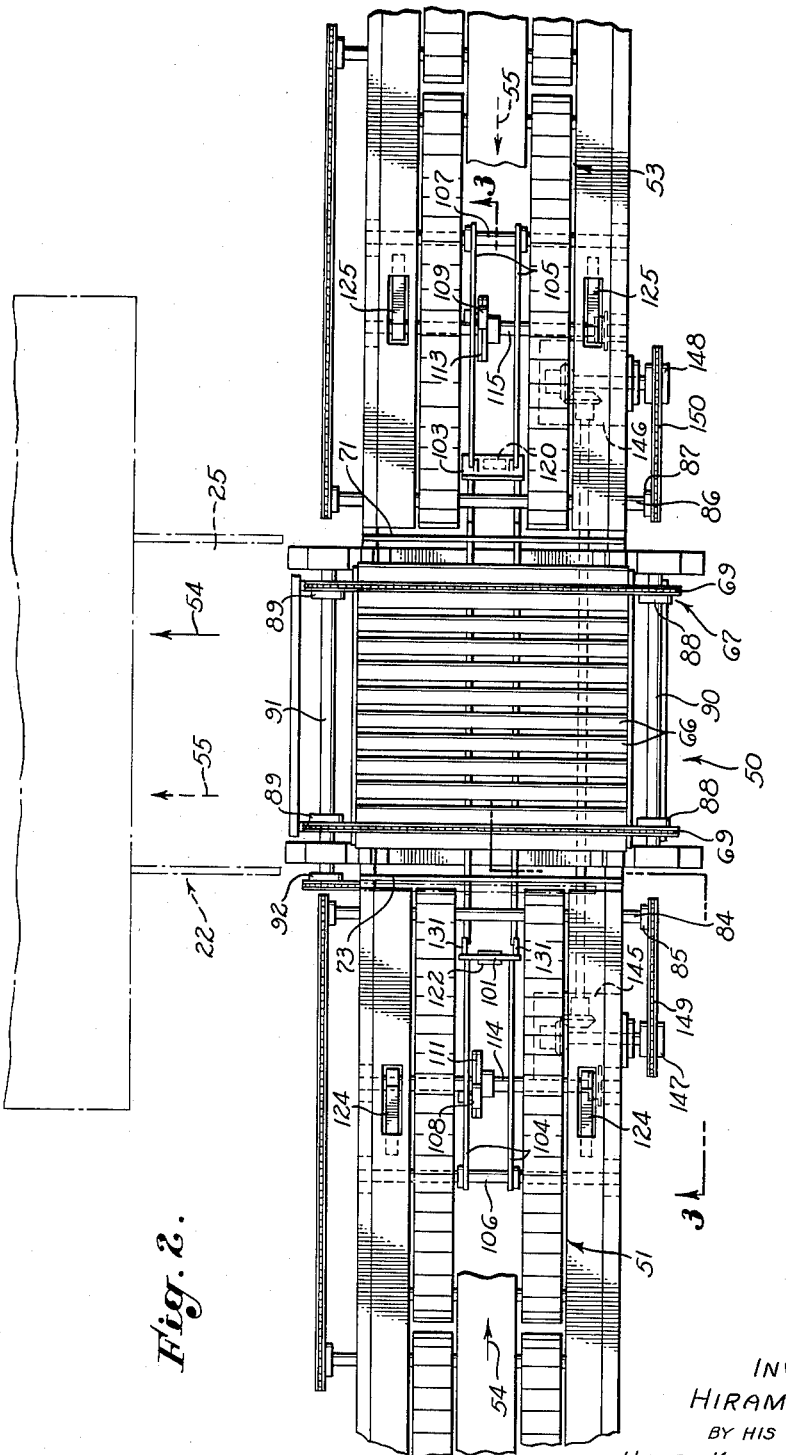
Fig. 2.
INVENTOR.
HIRAM E. TEMPLE
BY HIS ATTORNEYS.
HARRIS, KIECH, FOSTER & HARRIS
BY

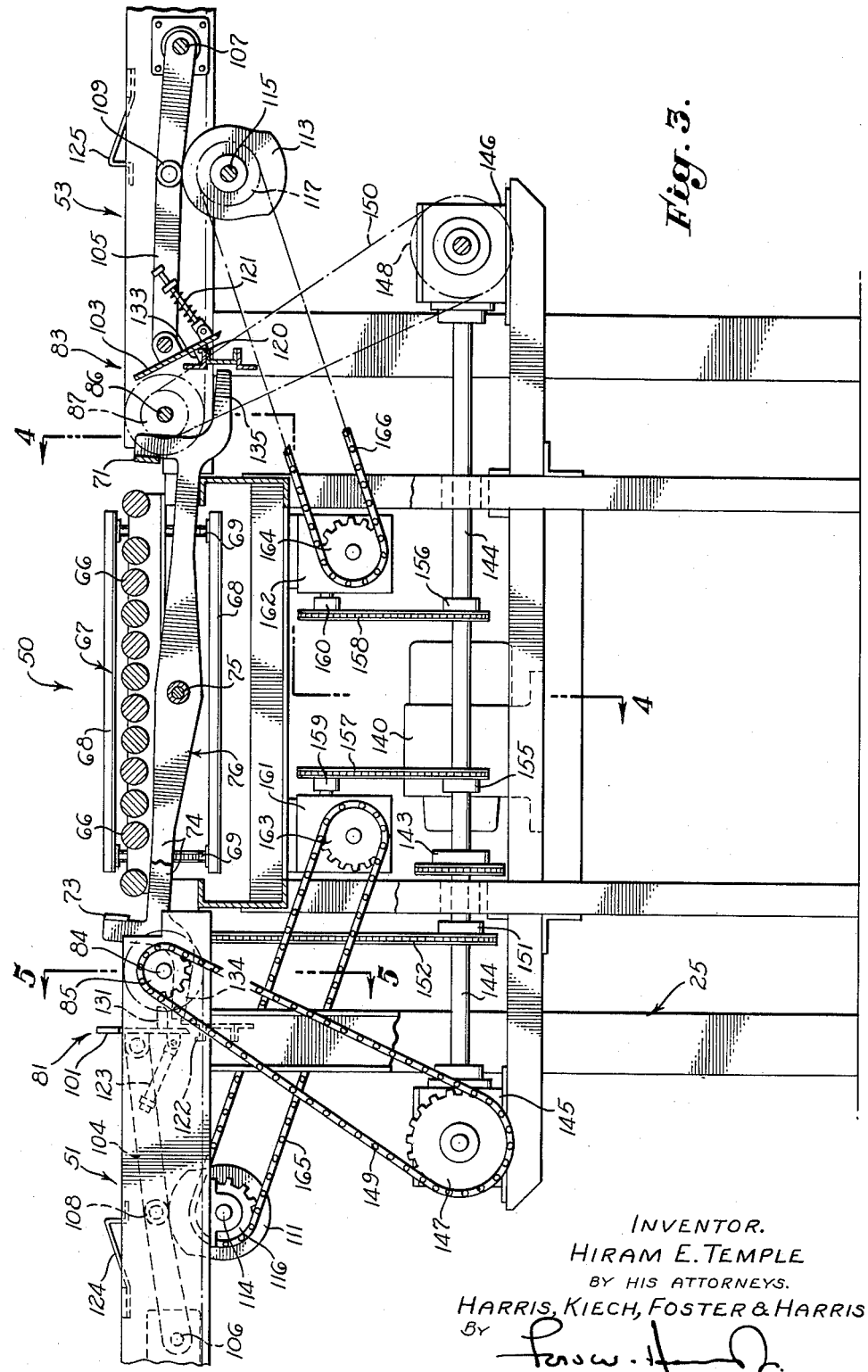

Jan. 24, 1956  H. E. TEMPLE  2,732,057
BAKERY CONVEYOR SYSTEM
Filed Dec. 5, 1951  9 Sheets-Sheet 4

INVENTOR.
HIRAM E. TEMPLE
BY HIS ATTORNEYS.
HARRIS, KIECH, FOSTER & HARRIS

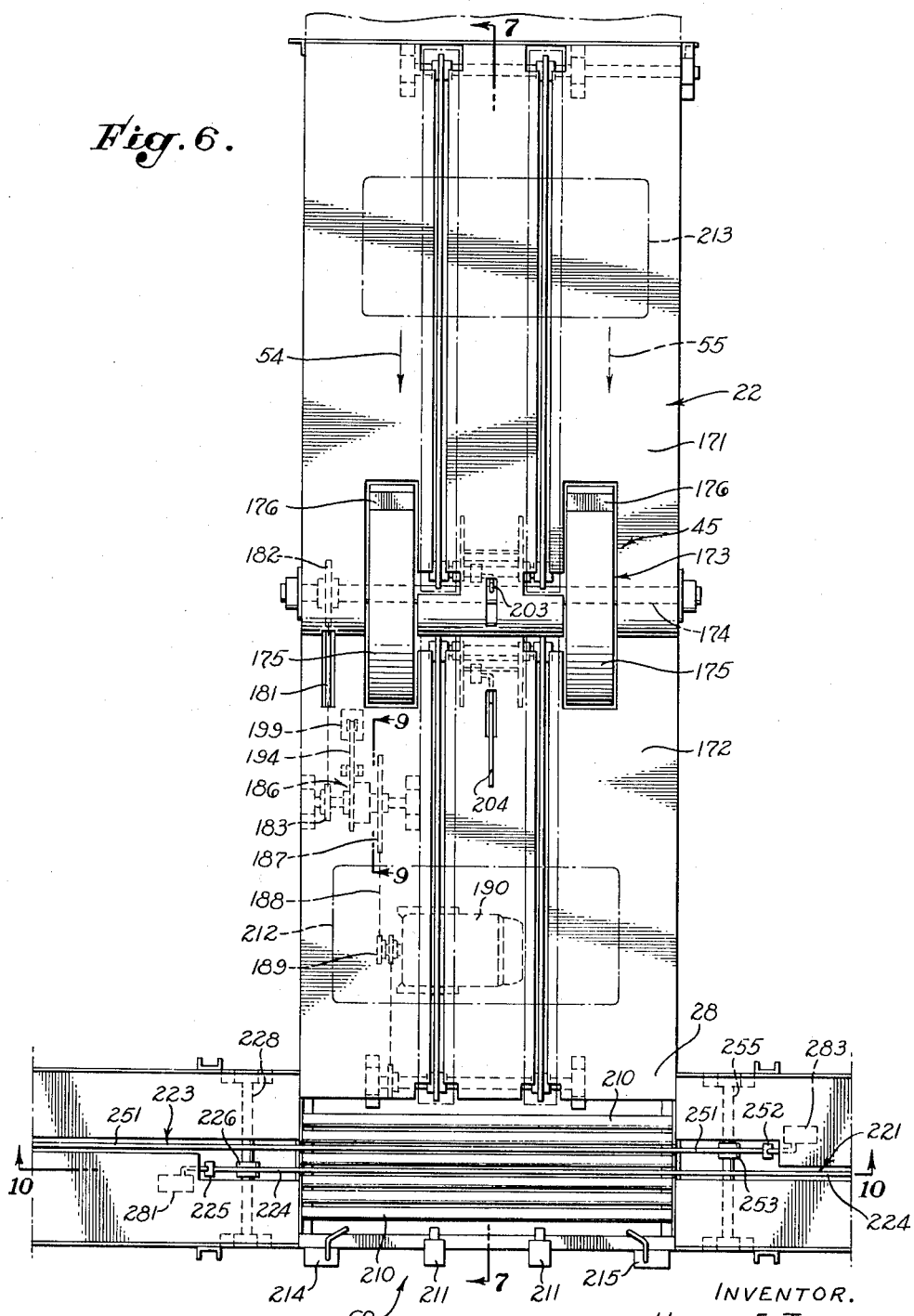

Jan. 24, 1956  H. E. TEMPLE  2,732,057
BAKERY CONVEYOR SYSTEM
Filed Dec. 5, 1951  9 Sheets-Sheet 6
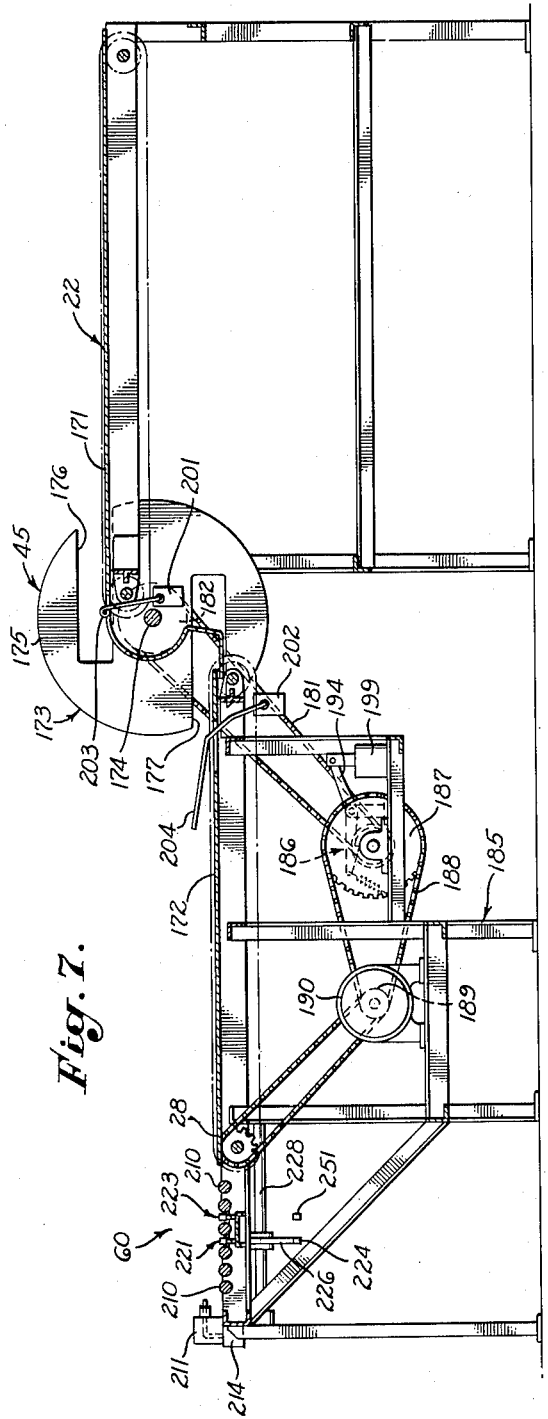
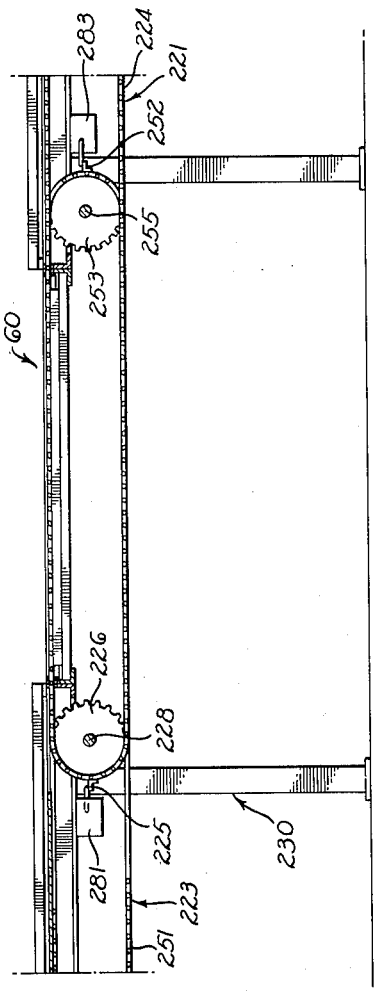
INVENTOR.
HIRAM E. TEMPLE
BY HIS ATTORNEYS.
HARRIS, KIECH, FOSTER & HARRIS Jan. 24, 1956   H. E. TEMPLE   2,732,057
BAKERY CONVEYOR SYSTEM
Filed Dec. 5, 1951   9 Sheets-Sheet 7

INVENTOR.
HIRAM E. TEMPLE
BY HIS ATTORNEYS.
HARRIS, KIECH, FOSTER & HARRIS

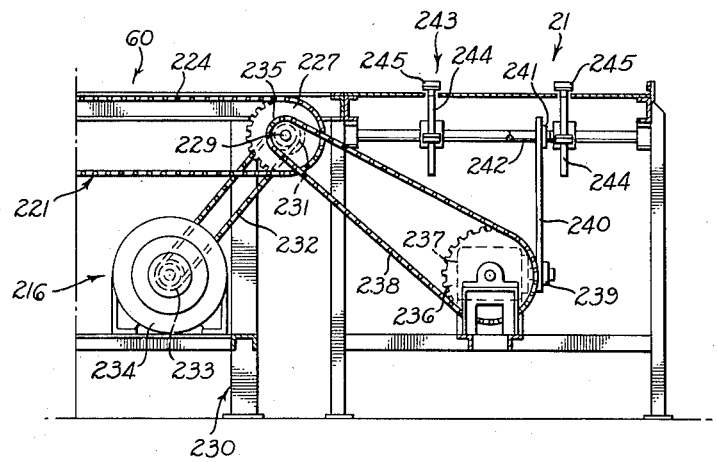
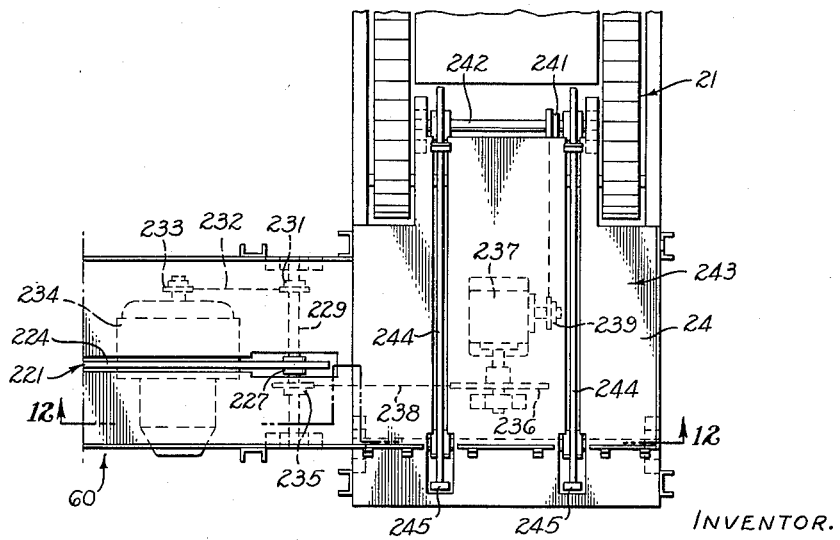

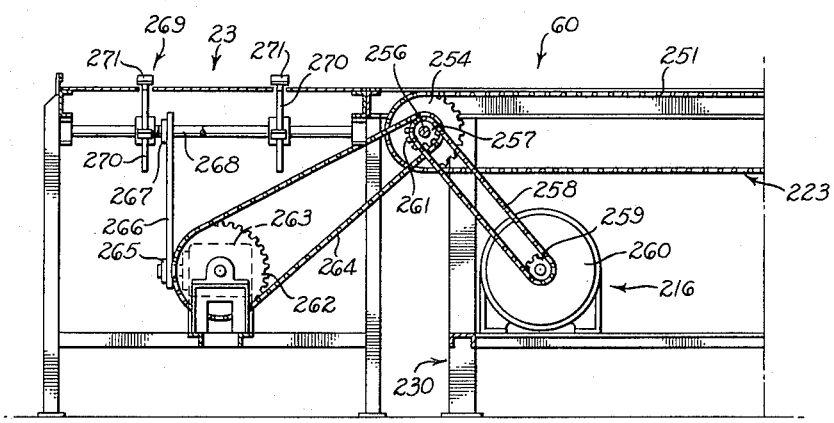
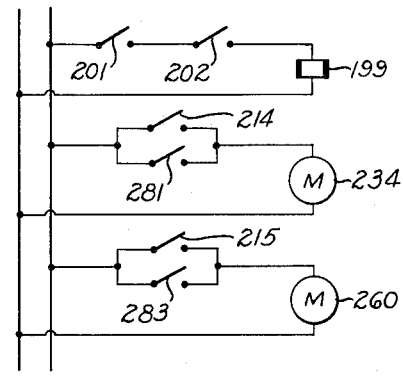
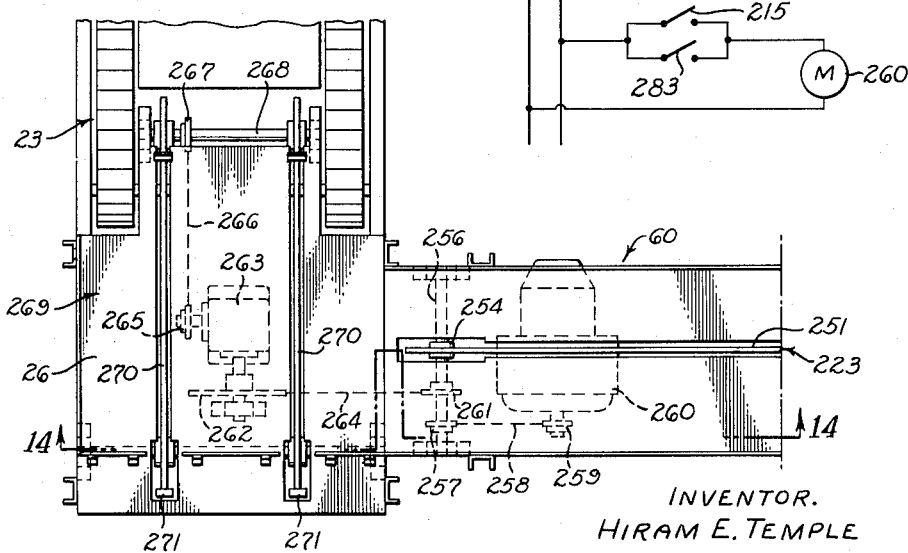

United States Patent Office 2,732,057
Patented Jan. 24, 1956

2,732,057

BAKERY CONVEYOR SYSTEM

Hiram E. Temple, San Gabriel, Calif., assignor to Read Standard Corporation, a corporation of Delaware Application December 5, 1951, Serial No. 260,061

11 Claims. (Cl. 198—85)

The present invention relates in general to bakery equipment and, more particularly, to a conveyor system for routing pans, or pan straps, through greasing and panning apparatus, ovens, and pan washing and drying apparatus, a primary object of the invention being to provide a conveyor system which continuously circulates the pans through such apparatus or equipment so that, as soon as each pan is emptied, it is washed and dried and then returned to the greasing and panning apparatus and is then returned to the oven. Thus, the present invention provides complete continuity, which is an important feature.

An important object of the invention is to provide a conveyor system which includes first, second and third conveyors disposed side by side with the second conveyor disposed between the first and third conveyors and with the inlet end of the second conveyor disposed adjacent the outlet ends of the first and third conveyors and the outlet end of the second conveyor disposed adjacent the inlet ends of the first and third conveyors.

Another object is to provide greasing and panning equipment and an oven in the line of the first and third conveyors and to provide pan washing and drying equipment in the line of the second conveyor.

Another object is to provide transfer means communicating with the outlet ends of the first and third conveyors and the inlet end of the second conveyor for transferring articles from the first conveyor to the second conveyor and articles from the third conveyor to the second conveyor, a related object being to provide selective distributing means communicating with the outlet end of the second conveyor and the inlet ends of the first and third conveyors for transferring from the second conveyor to the first conveyor articles originally transferred from the first conveyor to the second conveyor, and for transferring from the second conveyor to the third conveyor articles originally transferred from the third conveyor to the second conveyor, such articles being pans or pan straps in the exemplary application of the invention under consideration.

The foregoing bakery system provides a very compact installation requiring a mimimum of space, which is an important feature of the invention.

An important object of the invention is to provide transfer means for transferring articles from the first and third conveyors to the second conveyor which includes means for staggering the articles transferred from the first conveyor laterally with respect to the articles transferred from the third conveyor, and to provide a selective distributing means which includes transfer conveyor means operable either toward the first conveyor or the third conveyor, depending on whether the articles on the second conveyor are staggered to one side thereof or the other, for returning each article to the conveyor whence it originated.

More particularly, an object of the invention is to provide a staggering means which includes two stops respectively disposed between the outlet ends of the first and third conveyors and the inlet end of the second conveyor and which includes means for moving the stops between extended and retracted positions in alternating relation, the locations of the stops being such that an article from the first conveyor engaging one of the stops is staggered to one side of the second conveyor and an article from the third conveyor engaging the other of the stops is staggered to the other side of the second conveyor. A related object is to provide a selective distributing means which includes two transfer conveyors respectively adapted to convey the articles from one side of the second conveyor to the first conveyor and the articles from the other side of the second conveyor to the third conveyor so as to return the respective articles to the conveyors from which they originally came, the selective distributing means including actuating means for the transfer conveyors which are responsive to the positions of the articles on the second conveyor.

Another object is to provide a conveyor system wherein the transfer means for transferring articles from the first and third conveyors to the second conveyor includes two escapement means respectively adapted to pass articles one at a time from the first and third conveyors to the second conveyor, the two escapement means being alternately operable.

Preferably, the pans, or other articles, run through the washing and drying equipment in inverted positions, and another object of the invention is to provide means in the line of the second conveyor downstream from the washing and drying equipment for reinverting or righting the articles again before they are returned to the respective first and third conveyors.

Another object is to provide an inverting means which includes a rotor having a substantially semichordal article retainer which registers with spaced sections of the second conveyor in sequence as the rotor rotates whereby the retainer receives an article from one of the second-conveyor sections, inverts (rights) it, and delivers it to the other of the second-conveyor sections.

Another object is to provide an actuating means for the inverting rotor and to provide a control means which includes a control device responsible to the reception of an article by the retainer for energizing the actuating means and which includes another control device responsive to the delivery of the article to the other second-conveyor section for maintaining the actuating means de-energized until such time as the article has cleared the rotor.

While the present invention has hereinbefore been and will hereinafter be considered in connection with such articles as pans routed through greasing and panning equipment, ovens, and washing and drying equipment associated with the various conveyors, it will be understood that, in some instances, the conveyor system may be incorporated in other installations for other purposes without necessarily departing from the spirit of the invention.

The foregoing objects and advantages of the present invention, together with various other objects and advantages thereof which will become apparent, may be attained with the exemplary embodiment of the invention which is illustrated in the accompanying drawings and which is described in detail hereinafter. Referring to the drawings:

Fig. 1 is a semi-diagrammatic view of the conveyor system of the invention as applied to a bakery installation;

Fig. 2 is a plan view illustrating a transfer means of the invention, reference hereby being made to my copending application Serial No. 253,525, filed October 27, 1951, in connection with the transfer means;

Fig. 3 is a sectional view taken along the arrowed line 3—3 of Fig. 2;

Figure 5:
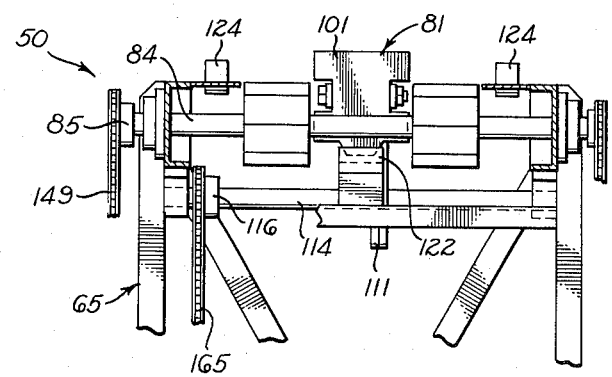
Figure 4:
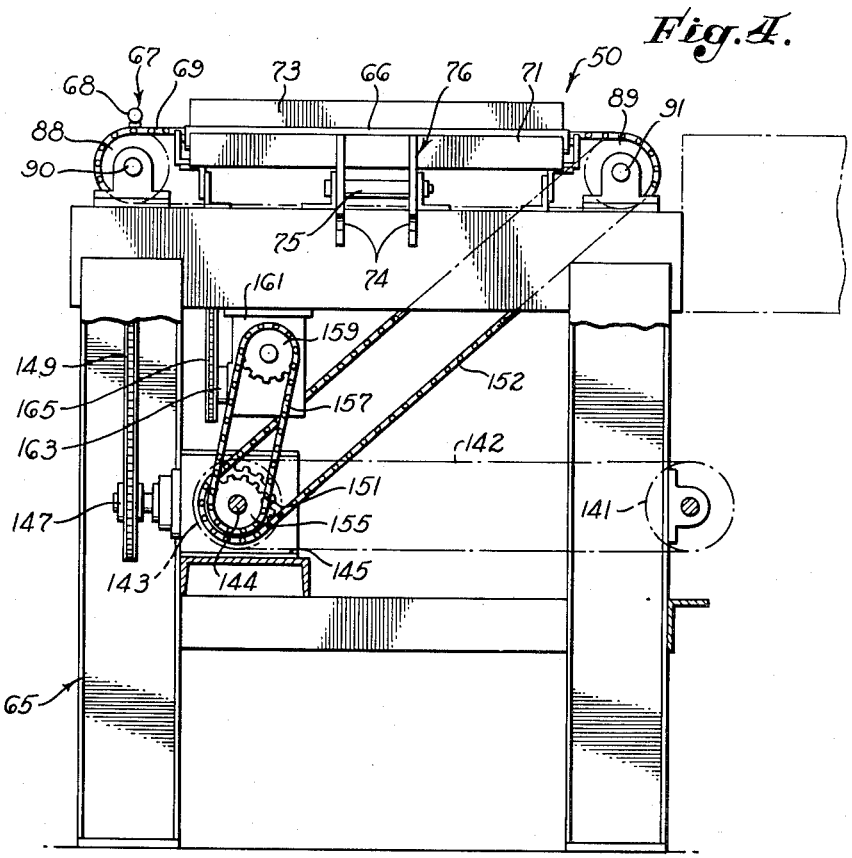
Figure 8:
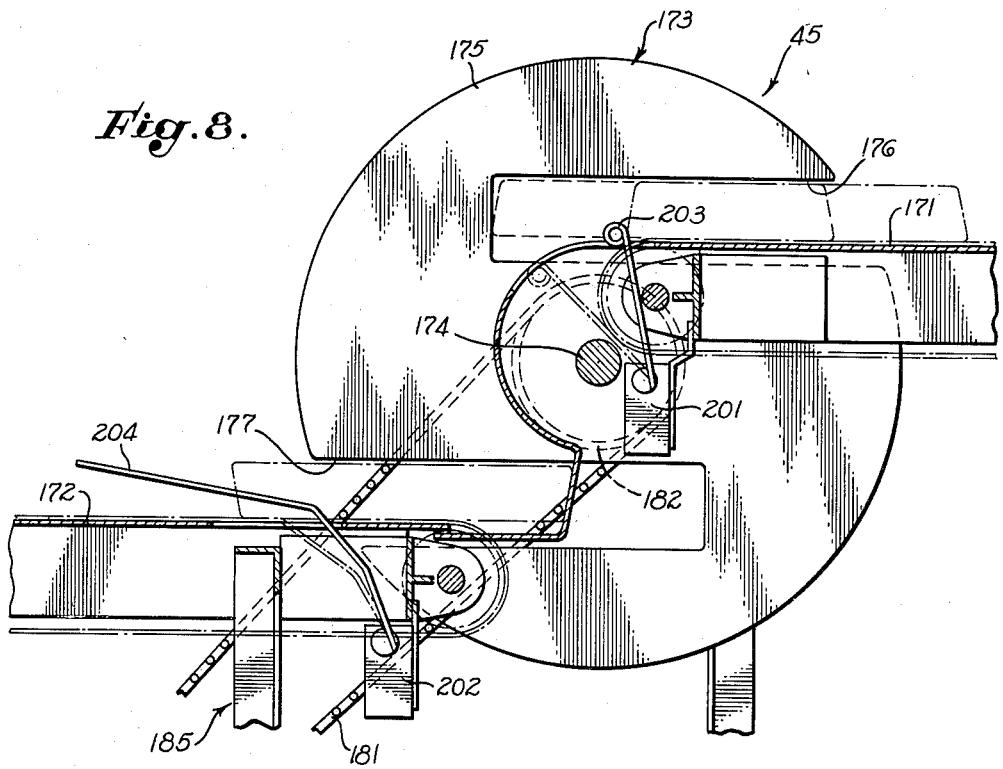
Figure 9:
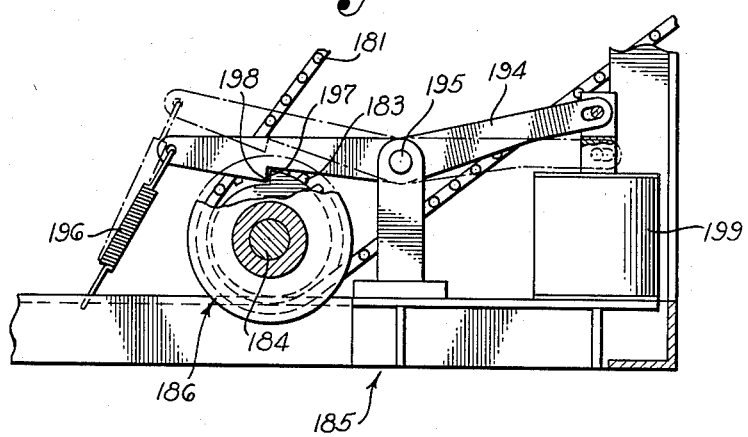

Figs. 4 and 5 are sectional views respectively taken along the arrowed lines 4—4 and 5—5 of Fig. 3;

Fig. 6 is a plan view of an inverting means and a selective distributing means of the invention;

Fig. 7 is a sectional view taken along the arrowed line 7—7 of Fig. 6;

Fig. 8 is an enlarged sectional view duplicating a portion of Fig. 7;

Figs. 9 and 10 are sectional views taken along the arrowed lines 9—9 and 10—10 of Fig. 6;

Fig. 11 is a rightward continuation of Fig. 6;

Fig. 12 is a sectional view taken along the arrowed line 12—12 of Fig. 11;

Fig. 13 is a leftward continuation of Fig. 6;

Fig. 14 is a sectional view taken along the arrowed line 14—14 of Fig. 13; and

Fig. 15 is a diagrammatic view of an electric circuit incorporated in the invention.

Referring particularly to Fig. 1 of the drawings, the numerals 21, 22 and 23 respectively designate conveyors which will be referred to hereinafter as first, second and third conveyors as a matter of convenience. The conveyors 21, 22 and 23 extend substantially the entire length of the installation illustrated in Fig. 1 of the drawings, the inlet ends of the three conveyors being designated by the numerals 24, 25 and 26, respectively, and the outlet ends thereof being designated by the numerals 27, 28 and 29, respectively. While the term "conveyor" is employed for the entire conveyor structure between the inlet end 24 and the outlet end 27, for example, it will be understood that this conveyor structure is not necessarily continuous and may comprise a plurality of conveyor sections, if desired, the same being true of the conveyors 22 and 23.

Disposed in the line of the conveyor 21 are a pan greaser 31 for applying grease to baking pans, a panner 32 for depositing dough in each pan after greasing, and an oven 33 through which the pans are conveyed as the goods therein are baked. Similarly, disposed in the line of the conveyor 23 are a greaser 34, a panner 35 and an oven 36. The pans may be run through individually, or, preferably, the pans are secured together in groups to form pan straps or pan units.

In the particular construction illustrated, bakery goods requiring no proofing may be baked, the pans being cake pans, for example. However, the invention may be applied to bread baking as well by introducing a proofer upstream from each of the ovens 33 and 36, if desired.

Disposed in the line of the second conveyor 22, going from right to left in Fig. 1 of the drawings, is a pan washing apparatus which includes a washing section 41 in which the pans are washed, a rinsing section 42, a drying section 43, and a cooling section 44 in which the pans are cooled prior to greasing. The pans are preferably washed, rinsed, dried and cooled in inverted positions and are preferably greased in upright positions, an inverting means 45 for righting the pans being disposed in the line of the second or intermediate conveyor 22 downstream from the cooling section 44 of the pan washing apparatus.

Communicating with the outlet ends 27 and 29 of the conveyors 21 and 23 and the inlet end 25 of the conveyor 22 is a transfer means 50 for transferring empty pans from the conveyors 21 and 23 to the conveyor 22, the transfer means 50 including transfer conveyors 51 and 53 which lead to the conveyor 22 from the conveyors 21 and 23, respectively. The baked goods in the pans are removed therefrom at points on the conveyors 21 and 23 upstream from the transfer means 50, either manually, or by automatic depanners. In either case, the empty pans are placed on the transfer conveyors 51 and 53 in inverted positions so that these transfer conveyors may convey the pans from the first and third conveyors 21 and 23 to the intermediate conveyor 22 for washing.

As will be discussed in detail hereinafter, the transfer means 50 staggers the pans emanating from the conveyor 23 laterally of the conveyor 22 with reference to the pans emanating from the conveyor 21, the path of the pans from the conveyor 21 throughout the system being indicated by the solid arrows 54 and the path of the pans from the conveyor 23 throughout the system being indicated by the broken arrows 55.

Communicating with the downstream or outlet end 28 of the conveyor 22 and with the inlet ends 24 and 26 of the conveyors 21 and 23 is a selective distributing means 60 for transferring from the conveyor 22 to the conveyor 21 pans originating in the conveyor 21, and for transferring from the conveyor 22 to the conveyor 23 pans originating in the conveyor 23, all as designated by the solid and broken arrows 54 and 55.

Thus, the conveyor system of the invention takes the pans from the conveyors 21 and 23, arranges the pans from these conveyors in staggered relation on the conveyor 22, and utilizes the staggering of the pans from the conveyors 21 and 23 to return the pans to the respective conveyors in which they originated. Thus, continuous, closed bakery systems are provided, the pans required by each side of the system always being returned thereto, which is an important feature.

The details of the greasers 31 and 34, the panners 32 and 35, the ovens 33 and 36, any depanners that may be used, and the sections 41 to 44 of the washing apparatus form no part of the present invention and will not be described herein. Consequently, only the transfer means 50, the inverting means 45 and the selective distributing means 60 will be considered in detail herein, the transfer means being considered first as a matter of convenience.

Referring to Figs. 2 to 5 of the drawings, the transfer means 50 includes a frame 65 which carries the two transfer conveyors 51 and 53, these conveyors being spaced apart, but being aligned and running toward each other. Also carried by the frame 65 and disposed between the two transfer conveyors 51 and 53 are gravity or idling rolls 66, the idling rolls being common to the two transfer conveyors and being regarded hereinafter as forming part of each. An article delivered by the transfer conveyor 51 onto the idling rolls 66 has sufficient momentum to move completely onto the idling rolls, the same being true of an article delivered by the transfer conveyor 53. The conveyor 22 extends transversely of the transfer conveyors 51 and 53 and registers with the idling rolls 66 thereof, the directions of movement of the articles, i. e., pans or pan straps, transported by the three conveyors 22, 51 and 53 being as indicated by the solid and broken arrows 54 and 55, discussed previously.

Movable transversely of the transfer conveyors 51 and 53 and in the direction of movement of the conveyor 22 is a sweep means 67 which is illustrated as including one or more sweeps 68 carried by endless chains 69. The upper runs of the chains 69 are disposed between pairs of the idling rolls 66 so that they do not interfere with movement of articles from the transfer conveyors 51 and 53 onto the idling rolls, the sweeps 68 being disposed above the idling rolls during the upper run of their movement.

In order to limit movement of articles, i. e., pans or pan straps, delivered to the sweep means 67 by the transfer conveyors 51, 53, stops 71 and 73 are provided which are movable between extended and retracted positions in alternating relation in a manner to be described so that the stop 71 is extended and the stop 73 retracted when an article is delivered by the transfer conveyor 51 and, similarly, the stop 71 is retracted and the stop 73 is extended when an article is delivered by the conveyor 53. The stops 71 and 73 are interconnected by a lever 74 which is pivoted at 75 for rocking movement relative to the frame 65.

The stops 71 and 73 are spaced apart a distance greater than the lengths of the pan straps intercepted thereby with the result that a pan strap from the transfer conveyor 51 which is intercepted by the stop 71 winds up on the right side of the conveyor 22, as viewed in Fig. 2 of the drawings, and a pan strap from the transfer conveyor 53 which is intercepted by the stop 73 is positioned adjacent the left side of the conveyor 22. Thus, the stops 71 and 73 constitute a staggering means 76 for staggering the pan straps emanating from the conveyor 21 laterally of the conveyor 22 with respect to pan straps emanating from the conveyor 23, as is indicated by the solid and broken arrows 54 and 55. As hereinbefore indicated, the selective distributing means 60 responds to this staggering to return each pan strap to the conveyor 21 or 23 whence it came, the selective distributing means being considered in detail hereinafter.

Associated with the respective transfer conveyors 51 and 53 upstream from the sweep means 67 are escapement means 81 and 83, each adapted to pass one pan strap at a time to the sweep means. The two escapement means operate in alternating relation and in timed relation with the stops 71 and 73 and the sweep means 67 so that pan straps are delivered to the sweep means by the transfer conveyors 51 and 53 in alternating relation.

Considering the transfer means 50 in more detail, the transfer conveyor 51 is driven from a shaft 84 having a drive sprocket 85 thereon and the transfer conveyor 53 is driven from a shaft 86 having a drive sprocket 87 thereon. The sweep means 67, as hereinbefore indicated, includes two endless chains 69, each chain being trained at one end around a sprocket 88 and at its other end around a sprocket 89. The sprockets 88 are fixed on a shaft 90 carried by suitable bearings on the frame 65, and the sprockets 89 are carried by a shaft 91 also mounted in suitable bearings on the frame, the shaft 91 also carrying a drive sprocket 92.

The escapement means 81 and 83 respectively associated with the transfer conveyors 51 and 53 respectively include gates 101 and 103, the gate 101 being disposed between conveying elements of the transfer conveyor 51 and the gate 103 being disposed between conveying elements of the transfer conveyor 53. The gates 101 and 103 are pivotally connected to arms 104 and 105, respectively, these arms being pivotally connected to the frame 65 at 106 and 107, respectively. The arms 104 and 105 carry cam-following rollers 108 and 109, respectively, these rollers engaging cams 111 and 113, respectively. The cams 111 and 113 are respectively mounted on shafts 114 and 115 which are journalled in suitable bearings carried by the frame 65, the shafts having drive sprockets 116 and 117 thereon, respectively.

As will be apparent, as the cams 111 and 113 rotate, they move the gates 101 and 103 between extended and retracted positions, the gates being adapted to intercept pan straps on the conveyors 51 and 53 when in their extended positions, and being withdrawn downwardly out of the paths of articles on these conveyors when in their retracted positions. The cams 111 and 113 are 180° out of phase so that the gate 101 is extended when the gate 103 is retracted, and vice versa. Thus, the escapement means 81 and 83 operate in alternating relation to pass articles from the transfer conveyors 51 and 53 to the sweep means 67 in alternating relation.

As best shown in Fig. 3, associated with the gate 103 is a latch means for preventing retraction of the gate in the event that no pan strap is pressing thereagainst when the cam 113 rotates into a position to permit retraction of the gate. This latch means includes a latch member 120 which intercepts the gate 103 as it tends to drop toward its retracted position as long as the gate 103 has not been rotated into an inclined position, shown in solid lines, by the pressure of a pan strap thereagainst. A compression spring 121 engaging the gate 103 acts thereon to bias it toward the broken line position shown in Fig. 3, which position the gate 103 assumes if no article on the conveyor 53 is pressing thereagainst. Consequently, with the gate 103 in the broken line position shown in Fig. 3, if the cam 113 rotates into a position to retract this gate, the latch member 120 intercepts the gate to prevent retraction thereof. Thus, the latch member 120 prevents passage of a pan strap, or other article, from the conveyor 53 to the sweep means 67 unless the pan strap is bearing against the gate 103 at the proper point in the operating cycle. This prevents an article arriving slightly late from being passed to the sweep means with the possibility that it might strike one of the sweeps 68.

Similar considerations are applicable to the gate 101, this gate being provided with a latching means which is also releasable in response to pressure of a pan strap, or other article, against the gate, this latching means including a latch member 122 and the gate being biased toward its latched position by a compression spring 123.

Such a gate and latching means structure is also disclosed in my copending applications Serial No. 187,861, filed October 2, 1950, and Serial No. 253,525, filed October 27, 1951, reference to which is hereby made.

In order to keep pan straps intercepted by the gates 101 and 103 from bouncing back, and thus failing to exert the pressure against the gates necessary to release the latching means associated therewith, I provide depressible spring clips 124 and 125 respectively spaced from the gates 101 and 103 distances substantially equal to the lengths of the pan straps being handled. As will be apparent, pan straps encountering the spring clips 124 and 125 will depress same and the spring clips will later move upwardly to keep the pan straps from bouncing back after they have passed over the clips.

The gates 101 and 103 are provided with lugs 131 and 133, respectively, which are adapted to engage arms 134 and 135, respectively, on the lever 74 carrying the stops 71 and 73. As the gate 101, for example, moves to its retracted position, the lug 131 thereon engages the arm 134 to rock the lever 74 into a position such that the stop 71, which limits movement of and staggers a pan strap delivered by the transfer conveyor 51, is moved to its extended position. Similarly, the stop 73 for limiting movement of and staggering a pan strap delivered by the transfer conveyor 53 is moved to its extended position by engagement of the lug 133 on the gate 103 with the arm 135 on the lever 74 when the gate 103 moves to its retracted position. Thus, the stops 71 and 73 are moved between their extended and retracted positions in alternating relation and in timed relation with the alternating operation of the gates 101 and 103. Friction at the pivot 75 for the lever 74 will ordinarily be sufficient to retain the stops 71 and 73 in the desired positions, although additional means, not shown, may be provided for this purpose if desired.

Considering the actuating means for the various elements of the transfer means 50, it includes an electric motor 140 which drives a sprocket 141, Fig. 4, a chain 142 being trained around the sprocket 141 and around the sprocket 143 on a shaft 144 which is carried by suitable bearings on the frame 65. The shaft 144 drives gear boxes 145 and 146 which, in turn, drive sprockets 147 and 148, respectively. Trained around the sprocket 147 and the drive sprocket 85 for the transfer conveyor 51 is a chain 149, and trained around the sprocket 148 and the drive sprocket 87 for the transfer conveyor 53 is a chain 150. Also carried by the shaft 144 is a sprocket 151 around which is trained a chain 152, this chain also being trained around the drive sprocket 92 for the sweep means 67. The shaft 144 further carries sprockets 155 and 156 around which are trained chains 157 and 158, respectively, these chains also being trained around sprockets 159 and 160, respectively, of gear boxes 161 and 162, respectively. These gear boxes drive sprockets 163 and 164, respectively, around which are trained chains 165 and 166, respectively, these chains also being trained around the drive sprockets 116 and 117, respectively, for the cams 111 and 113, respectively. Thus, all of the various elements of the transfer means 50 are driven in timed relation by the motor 140 through the various mechanisms heretofore described.

Considering the over-all operation of the transfer means 50, it will be assumed that the motor 140 is operating and that files of pan straps emanating from the conveyors 21 and 23 are on the transfer conveyors 51 and 53, respectively. With the various elements of the transfer means in the positions shown in Fig. 3 of the drawings, the gate 103 has been retracted to permit passage of a pan strap to the sweep means 67 to be engaged by one of the sweeps 68 for transfer to the conveyor 22. Subsequently, the cam 113 extends the gate 103 to intercept the next article on the conveyor 53 and, at the same time, the cam 111 rotates to a position to retract the gate 101. If a pan strap is pressing against the gate 101, this gate will move past the latch member 122 and into its retracted position to permit passage of the pan strap to the sweep means. Otherwise, the gate 101 will not retract. Thereafter, the cam 111 rotates to a position to extend the gate 101 again and the cam 113 moves to a position to permit the gate 103 to retract again, provided a pan strap is pressing thereagainst. If no pan strap is pressing against the gate 103, it will, of course, be prevented from retracting by the latch member 120. Thus, the gates 101 and 103 feed pan straps to the sweep means 67 in timed relation with the operation of the sweep means, each gate skipping a beat whenever no article is pressing thereagainst at the time its cam permits it to retract.

As each gate moves to its retracted position, it rocks the lever 74 carrying the stops 71 and 73 into a position to bring the corresponding stop into its extended position and the other stop into its retracted position. For example, as the gate 101 moves into its retracted position, it extends the stop 71 for limiting movement of and staggering a pan strap delivered to the sweep means by the transfer conveyor 51 and, at the same time, retracts the stop 73 to permit passage of the pan strap thereover. The gate 103 operates the staggering means 76 in a similar, but opposite, manner.

Thus, the transfer means 50 alternately transfers pan straps from the conveyors 21 and 23 to the conveyor 22, this alternating relation obtaining so long as continuous streams of pan straps arrive at the two escapement means 81 and 83. If there is a gap in one of the streams of pan straps, the system will continue to transfer pan straps from the other of the conveyors 21 and 23 to the conveyor 22 until such time as the gap disappears.

Thus, the transfer means 50 positions the pan straps from the conveyors 21 and 23 on the conveyor 22 in staggered relation, the pan straps originating in the conveyor 21 being positioned on one side of the conveyor 22 and the pan straps originating in the conveyor 23 being positioned on the opposite side of the conveyor 22. The staggered pan straps on the conveyor 22 proceed through the washing, rinsing, drying and cooling sections 41 to 44 of the pan washing apparatus and thereafter arrive at the inverting means 45, which will now be considered in detail.

Referring to Figs. 6 to 9 and 15 of the drawings, the conveyor 22 is divided into two sections 171 and 172 which are spaced apart and which are preferably located at different levels with the conveyor section 171 above the conveyor section 172, all as best shown in Figs. 7 and 8 of the drawings. The inverting means 45 for righting the pan straps is disposed between the two conveyor sections 171 and 172 and includes a rotor 173 carried by a shaft 174 which is disposed between the conveyor sections 171 and 172, this shaft extending transversely of the conveyor sections. In the particular construction illustrated, the rotor 173 includes two drums 175 each having therein two substantially semichordal notches 176 and 177 which are offset from the axis of rotation of the rotor. In other words, in the particular constructions illustrated, each notch 176 and 177 extends along a nondiametral chord line, but does not extend entirely through the corresponding drum 175, the term substantially semichordal having been selected as descriptive of the notches 176 and 177. As the rotor 173 rotates, the notches 176 register first with the conveyor section 171, as shown in Figs. 7 and 8 of the drawings, and subsequently register with the conveyor section 172, the notches 176 being above the conveyor sections in the so-called registering positions thereof. The notches 177 register with the conveyor sections 171 and 172 in sequence in a similar manner. When the notches 176, for example, register with the conveyor section 171, they are adapted to receive and retain a pan strap delivered thereinto by the conveyor section 171, the notches 176 being referred to as retainers hereinafter. Subsequently, as the rotor 173 rotates into a position such that the retainers 176 register with the conveyor section 172, a pan strap retained thereby is delivered to or deposited on the conveyor section 172 and is withdrawn from the retainers 176 by the conveyor section 172. As will be apparent, as a pan strap is transferred from the conveyor section 171 to the conveyor 172 in this manner, it is inverted with respect to its original position on the conveyor section 171. Since the pan strap was preferably in its inverted position when on the conveyor section 171, it is right side up after being transferred to the conveyor section 172 by the inverting means 45.

Considering the manner in which the rotor 173 is driven, a chain 181 is trained around a sprocket 182 on the shaft 174 and a sprocket 183 on a shaft 184 which is carried in suitable bearings on a frame 185 of the inverting means 45. Associated with the shaft 184 is a single-revolution clutch 186 which, when engaged, drives the sprocket 183 and which is driven by the sprocket 187 on the shaft 184, the sprocket 187 having trained therearound a chain 188 which is also trained around a sprocket 189 on the shaft of an electric motor 190.

The single-revolution clutch 186 is controlled by a lever 194 which is pivoted to the frame 185 at 195 and which is biased toward a clutch-disengaging position, i. e., a position wherein it disengages the single-revolution clutch 186, by a spring 196. The lever 194 is provided with a shoulder 197 adapted to engage a shoulder 198 on an element of the single-revolution clutch 186 to disengage the clutch. From the clutch-disengaging position, which is shown in solid lines in Fig. 9, the lever 194 is adapted to be pivoted to a clutch-engaging position, i. e., a position wherein the shoulder 197 disengages the shoulder 198 to permit the single-revolution clutch to engage for one revolution, by a solenoid 199 pivotally connected to the lever.

As best shown in Fig. 15, the solenoid 199 has two switches 201 and 202 connected in series therewith, these switches also being shown in Fig. 8 of the drawings. Referring to Fig. 8, the switch 201 is disposed adjacent the conveyor section 171 and is actuated by a pivoted arm 203 which is engageable by a pan strap entering the retainers 176, or the retainers 177, to close the switch 201. The switch 202 is located adjacent the conveyor section 172 and is adapted to be opened by a pivoted arm 204, the latter extending upwardly above the conveyor section 172 so that it is engaged by a pan strap delivered to the conveyor section 172 to open the switch 202 until such time as the pan strap completely clears the rotor 173.

Considering the operation of the inverting means 45, it will be assumed that the lever 194 is in its clutch-disengaging position so that the single-revolution clutch 186 is disengaged, the result being that the rotor 173 is stationary with the retainers 176 and 177 in registry with the conveyor sections 171 and 172, not necessarily respectively. As soon as a pan strap is delivered to the retainers in registry with the conveyor section 171 by this conveyor section, the pan strap closes the switch 201, it being assumed that any preceding pan strap has cleared the rotor so that the switch 202 is also closed. Consequently, the solenoid 199 is energized to pivot the lever 194 to its clutch-engaging position, which results in rotation of the rotor 173, the diameter ratio between the sprockets 182 and 183 being such that the rotor 173 rotates through one half revolution for each revolution of the single-revolution clutch 186. As soon as the rotor 173 starts to rotate, the pan strap carried by the retainers in registry with the conveyor section 171 disengages the arm 203 so that the switch 201 may open to de-energize the solenoid 199. This permits the spring 196 to bias the lever 194 back toward its clutch-disengaging position, although the lever 194 does not disengage the single-revolution clutch 186 until such time as it has completed one revolution, whereupon the shoulder 198 of the clutch engages the shoulder 197 of the lever to disengage the clutch. At this point, the rotor 173 has completed one half of a revolution so that the retainers which were formerly in registry with the conveyor section 171 are in registry with the conveyor section 172, and vice versa. Consequently, the conveyor section 172 withdraws the pan strap from the retainers, the pan strap maintaining the switch 202 open until such time as it completely clears the rotor. This feature prevents starting of the rotor until the pan strap on the conveyor section 172 has cleared, even though another pan strap may meanwhile have been delivered to the inverting means 45 by the conveyor section 171. Thus, any possibility of damage is prevented, which is an important feature.

Thus, the inverting means 45 rights the pan straps prior to their arrival at the selective distributing means 60, this righting operation taking place without disturbing the staggering of the pan straps originating in the conveyor 21 relative to the pan straps originating in the conveyor 23.

Considering the selective distributing means 60 with reference to Figs. 6, 7 and 10 to 15, the conveyor 22 terminates in gravity or idling rolls 210 across which each pan strap moves by virtue of its own momentum, to be stopped by spring bumpers 211. Referring particularly to Fig. 6 of the drawings, shown therein are two pan straps 212 and 213, the pan strap 212 being from the conveyor 21 and being staggered to the left and the pan strap 213 being from the conveyor 23 and being staggered to the right. At the end of the conveyor 22 in a position to be engaged by the pan strap 212, but not by the pan strap 213, is a switch 214, an oppositely located switch 215 engageable by the pan strap 213, but not by the pan strap 212, also being provided. These switches serve as actuating elements in an actuating means 216, Figs. 11 to 14, for actuating transfer conveyors 221 and 223 leading to the conveyors 21 and 23, respectively, in such a manner as to return the respective pan straps 212 and 213 to the conveyors whence they came, the transfer conveyors moving the pan straps laterally off the idling rolls 210. The spring bumpers 211 serve to move the pan straps away from the switches 214 and 215 slightly after the pan straps have closed these switches momentarily so as to keep the pan strap 212, for example, from actuating the switch 215 as it is moved laterally off the gravity rolls 210.

Considering the selective distributing means 60 in more detail, the transfer conveyor 221 comprises a chain 224 which carries a sweep 225, the upper run of the chain 224 being disposed between two of the gravity rolls 210 so that only the sweep 225 projects above the gravity rolls. The chain 224 is trained around sprockets 226 and 227 respectively mounted on shafts 228 and 229 carried by suitable bearings on a frame 230 of the selective distributing means 60. The sprocket 226 is visible in Figs. 6 and 10 of the drawings and the sprocket 227 in Figs. 11 and 12 thereof. Also mounted on the shaft 229 is a sprocket 231 around which is trained a chain 232, the latter also being trained around a sprocket 233 on the shaft of an electric motor 234, which drives the transfer conveyor 221. Also on the shaft 229 is a sprocket 235 which drives a sprocket 236 on a gear box 237 through a chain 238, the gear box having an output sprocket 239 which, through a chain 240, drives a sprocket 241 on a shaft 242 of a section 243 of the conveyor 21, the transfer conveyor 221 being adapted to deliver the pan strap 212 to the conveyor section 243. The latter preferably includes chains 244 having sweeps 245 thereon so that the conveyor section 243 serves to space the pan straps delivered to the conveyor 21 uniformly.

Similarly, the transfer conveyor 223 includes an endless chain 251 which carries a sweep 252 and the upper run of which is disposed between two of the gravity rolls 210 so that only the sweep 252 projects thereabove, the chain 251 being spaced from and parallel to the chain 224 of the transfer conveyor 221. The chain 251 is trained around sprockets 253 and 254 respectively shown in Figs. 6 and 10 and Figs. 13 and 14 and respectively mounted on shafts 255 and 256. The shaft 256 carries a sprocket 257 which is driven by a chain 258 from a sprocket 259 on the shaft of an electric motor 260. Another sprocket 261 on the shaft 256 drives a sprocket 262 on a gear box 263 through a chain 264, the gear box having an output sprocket 265 which drives a chain 266 trained therearound and around a sprocket 267 on a shaft 268 of a section 269 of the conveyor 23. The conveyor section 269 preferably includes chains 270 carrying sweeps 271 so that the conveyor section 269 spaces apart uniformly pan straps delivered to the conveyor 23 by the transfer conveyor 223.

The sweep 225 on the chain 224 of the transfer conveyor 221 is adapted to open a normally closed limit switch 281, Figs. 6 and 10, at the end of each cycle of movement of the transfer conveyor 221. Similarly, the sweep 252 on the chain 251 of the transfer conveyor 223 is adapted to open a normally closed limit switch 283, Figs. 6 and 10, at the end of each cycle of movement of the transfer conveyor 223. The switches 281 and 214 are connected in parallel with respect to each other and in series with the motor 234 for driving the transfer conveyor 221, and the switches 283 and 215 are connected in parallel with respect to each other and in series with the motor 260 for driving the transfer conveyor 223.

Considering the operation of the selective distributing means 60, it will be assumed that the transfer conveyors 221 and 223 are in their rest positions wherein the respective sweeps 225 and 252 thereof are holding the limit switches 281 and 283 open. When the pan strap 212 on the conveyor 22 engages the switch 214, which is connected in parallel with the switch 281, the switch 214 is closed momentarily to energize the electric motor 234. As soon as the electric motor 234 starts, the sweep 225 disengages the limit switch 281 to permit it to close so that only momentary closure of the switch 214 is necessary. The sweep 225 then transfers the pan strap 212 to the conveyor 21 and, at the end of the cycle of movement of the sweep 225, it re-engages the limit switch 281 to stop the motor 234. In a similar manner, the next pan strap 213 is transferred to the conveyor 23 by the transfer conveyor 223, the pan strap 213 energizing the motor 260 by contact with the switch 215.

Thus, the conveyor system of the invention conveys articles from two different sources along a common path and returns the articles to their respective sources, thereby permitting the use of a common pan washing apparatus for the two baking installations disclosed without any necessity for manual unscrambling of the pan straps utilized in the respective baking installations. Although an exemplary embodiment of the invention has been disclosed herein, it will be understood that various changes, modifications and substitutions may be incorporated therein without departing from the spirit of the invention.

I claim as my invention:

1. In a conveyor system, the combination of: first, second and third conveyors each having inlet and outlet ends; transfer means communicating with said outlet ends of said first and third conveyors and said inlet end of said second conveyor for transferring first-conveyor articles from said first conveyor to said second conveyor and third-conveyor articles from said third conveyor to said second conveyor, said transfer means including means for staggering the first-conveyor articles relative to the third-conveyor articles transversely of said second conveyor; and selective distributing means communicating with said outlet end of said second conveyor and said inlet ends of said first and third conveyors for transferring the first-conveyor articles from said second conveyor to said first conveyor and the third-conveyor articles from said second conveyor to said third conveyor, said selective distributing means being responsive to the staggering of the first-conveyor articles relative to the third-conveyor articles on said second conveyor.

2. In a conveyor system, the combination of: first, second and third conveyors disposed side by side and each having inlet and outlet ends, said second conveyor being disposed between said first and third conveyors with its inlet end adjacent the outlet ends of said first and third conveyors and with its outlet end adjacent the inlet ends of said first and third conveyors; transfer means communicating with said outlet ends of said first and third conveyors and said inlet end of said second conveyor for transferring first-conveyor articles from said first conveyor to said second conveyor and third-conveyor articles from said third conveyor to said second conveyor, said transfer means including means for staggering the first-conveyor articles relative to the third-conveyor articles transversely of said second conveyor; and selective distributing means communicating with said outlet end of said second conveyor and said inlet ends of said first and third conveyors for transferring the first-conveyor articles from said second conveyor to said first conveyor and the third-conveyor articles from said second conveyor to said third conveyor, said selective distributing means being responsive to the staggering of the first-conveyor articles relative to the third-conveyor articles on said second conveyor.

3. In a conveyor system, the combination of: first, second and third conveyors disposed side by side and each having inlet and outlet ends, said second conveyor being disposed between said first and third conveyors with its inlet end adjacent the outlet ends of said first and third conveyors and with its outlet end adjacent the inlet ends of said first and third conveyors; transfer means communicating with said outlet ends of said first and third conveyors and said inlet end of said second conveyor for transferring first-conveyor articles from said first conveyor to said second conveyor and third-conveyor articles from said third conveyor to said second conveyor, said transfer means including means for staggering the first-conveyor articles relative to the third-conveyor articles transversely of said second conveyor; and selective distributing means communicating with said outlet end of said second conveyor and said inlet ends of said first and third conveyors for transferring the first-conveyor articles from said second conveyor to said first conveyor and the third-conveyor articles from said second conveyor to said third conveyor, said selective distributing means including two transfer conveyors respectively communicating with said inlet end of said first conveyor and said inlet end of said third conveyor and respectively adapted to convey the first-conveyor articles to said first conveyor and the third-conveyor articles to said third conveyor, said selective distributing means also including two actuating means respectively having actuating elements engageable by the first-conveyor articles and the third-conveyor articles on said second conveyor for energizing said transfer conveyors, respectively.

4. A conveyor system according to claim 3 wherein said staggering means includes two stops respectively disposed between said outlet ends of said first and third conveyors and said inlet end of said second conveyor, and includes means for moving said stops between extended and retracted positions in alternating relation.

5. A conveyor system according to claim 3 wherein said actuating means respectively include electric circuits and wherein said actuating elements are switches respectively disposed in said electric circuits.

6. In a conveyor system, the combination of: first, second and third conveyors disposed side by side and each having inlet and outlet ends, said second conveyor being disposed between said first and third conveyors with its inlet end adjacent the outlet ends of said first and third conveyors and with its outlet end adjacent the inlet ends of said first and third conveyors; transfer means communicating with said outlet ends of said first and third conveyors and said inlet end of said second conveyor for transferring first-conveyor articles from said first conveyor to said second conveyor and third-conveyor articles from said third conveyor to said second conveyor, said transfer means including means for staggering the first-conveyor articles relative to the third-conveyor articles transversely of said second conveyor, said staggering means including two stops respectively disposed between said outlet ends of said first and third conveyors and said inlet end of said second conveyor and including means for moving said stops between extended and retracted positions in alternating relation; and selective distributing means responsive to the staggering of the first-conveyor articles and the third-conveyor articles on said second conveyor and communicating with said outlet end of said second conveyor and said inlet ends of said first and third conveyors for transferring the first-conveyor articles from said second conveyor to said first conveyor and the third-conveyor articles from said second conveyor to said third conveyor.

7. A conveyor system as defined in claim 1 wherein said transfer means includes two escapement means respectively disposed between said outlet ends of said first and third conveyors and said inlet end of said second conveyor and each adapted to pass one article at a time, said transfer means also including means for operating said two escapement means in alternating relation.

8. In a conveyor system, the combination of: a main conveyor having inlet and outlet ends and adapted to convey articles staggered laterally thereof; two transfer conveyors communicating with said outlet end of said main conveyor and respectively adapted to convey articles from opposite sides of said main conveyor; and two actuating means respectively including actuating elements operable by articles on opposite sides of said main conveyor for energizing said transfer conveyors, respectively.

9. A conveyor system according to claim 8 wherein said two actuating means respectively include electric circuits and wherein said actuating elements are switches respectively disposed in said circuits.

10. A conveyor system according to claim 8 wherein said actuating means respectively include electric motors respectively operatively connected to said transfer conveyors, and wherein said actuating elements are switches respectively connected to said electric motors.

11. In a conveyor system, the combination of: a main conveyor having inlet and outlet ends and adapted to convey articles staggered laterally thereof; transfer conveyor means operable in either of two directions for conveying articles from opposite sides of said main conveyor in said directions, respectively, said transfer conveyor means communicating with said outlet end of said main conveyor; and actuating means including two actuating elements respectively operable by articles on opposite sides of said main conveyor for energizing said transfer conveyor means in said directions, respectively.

References Cited in the file of this patent

UNITED STATES PATENTS

| | | |
|---|---|---|
| 1,804,153 | Cowley | May 5, 1931 |
| 2,115,805 | Fuller | May 3, 1938 |
| 2,119,642 | McClatchie | June 7, 1938 |
| 2,189,451 | Peters | Feb. 6, 1940 |
| 2,362,079 | McCann | Nov. 7, 1944 |
| 2,558,774 | Nordquist | July 3, 1951 |
| 2,576,369 | Sticelber | Nov. 27, 1951 |